(12) United States Patent
Nguyen et al.

(10) Patent No.: US 8,362,945 B2
(45) Date of Patent: Jan. 29, 2013

(54) SYSTEMS AND METHODS FOR DETECTING AND TRACKING GUN BARRELS USING MILLIMETER WAVES

(75) Inventors: Tien M. Nguyen, Yorba Linda, CA (US); John J. Wootan, El Segundo, CA (US)

(73) Assignee: Raytheon Company, Waltham, MA (US)

( * ) Notice: Subject to any disclaimer, the term of this patent is extended or adjusted under 35 U.S.C. 154(b) by 310 days.

(21) Appl. No.: 12/897,660

(22) Filed: Oct. 4, 2010

(65) Prior Publication Data

US 2012/0256779 A1  Oct. 11, 2012

(51) Int. Cl.
G01S 13/00 (2006.01)

(52) U.S. Cl. .............................. 342/90; 342/27; 342/189

(58) Field of Classification Search .................... 342/27, 342/90, 189
See application file for complete search history.

(56) References Cited

U.S. PATENT DOCUMENTS

| | | | |
|---|---|---|---|
| 5,476,385 A | 12/1995 | Parikh et al. | |
| 5,638,298 A | 6/1997 | Edwards | |
| 5,686,686 A | 11/1997 | Woodall, Jr. et al. | |
| 5,692,029 A * | 11/1997 | Husseiny et al. | 378/88 |
| 5,703,835 A | 12/1997 | Sharkey et al. | |
| 5,745,071 A | 4/1998 | Blackmon, Jr. et al. | |
| 6,359,582 B1 | 3/2002 | MacAleese et al. | |
| 6,579,098 B2 | 6/2003 | Shechter | |
| 6,657,429 B1 | 12/2003 | Goldfine et al. | |
| 6,666,811 B1 | 12/2003 | Good | |
| 6,701,818 B1 | 3/2004 | O'Dwyer | |
| 6,863,532 B1 | 3/2005 | Ambrosoli | |
| 6,952,095 B1 | 10/2005 | Goldfine et al. | |
| 7,230,421 B2 | 6/2007 | Goldfine et al. | |
| 7,348,771 B2 | 3/2008 | Goldfine et al. | |
| 7,420,195 B2 | 9/2008 | Cerwin et al. | |
| 7,768,444 B1 | 8/2010 | Rourk | |
| 8,049,659 B1 * | 11/2011 | Sullivan et al. | 342/90 |
| 2003/0136900 A1 | 7/2003 | Shechter et al. | |
| 2004/0244625 A1 | 12/2004 | Tiernan et al. | |
| 2010/0079280 A1 | 4/2010 | Lacaze et al. | |
| 2011/0181300 A1 * | 7/2011 | Bowring et al. | 324/637 |

OTHER PUBLICATIONS

Extended European Search report for European application No. 11182131.0, Extended European search report dated Nov. 15, 2011 and mailed Nov. 22, 2011 (7 pgs.).
David Lynch, DL Sciences, Northridge, CA, "Resonance Weapon Recognition," Appendix C of a Report titled "Gaining New Military Capabilities: An Experiment in Concept Development," by John Birkler, et al., 1998, pp. 61-69.
Cheng-Hung Lin, et al., A TEM Horn Antenna Design and Measurement, 12th WSEAS International Conference on Communications, Heraklion, Greece, Jul. 23-25, 2008, ISSN: 1790-5117, ISBN: 978-960-6766-84-8, pp. 82-84.

* cited by examiner

*Primary Examiner* — Timothy A Brainard
(74) *Attorney, Agent, or Firm* — Christie, Parker & Hale, LLP

(57) ABSTRACT

Systems and methods for detecting and tracking a gun using millimeter waves are provided. In one embodiment, the invention relates to a method for detecting and tracking a gun using radio frequency waves at millimeter wavelengths, the method including storing empirical data, for up to N types of guns, including information indicative of a resonant frequency of a barrel of each of the N guns, generating pulse energy including at least one sequence of pulses at millimeter wave frequencies for each of the N guns, transmitting the pulse energy, receiving reflected pulse energy, filtering the reflected pulse energy to a preselected bandwidth for each of the N guns, determining a first maximum value of the filtered reflected pulse energy in each of the preselected bandwidths that exceeds a preselected threshold, determining a second maximum value among the first maximum values, and correlating a frequency of the second maximum value with the stored resonant frequencies of the N guns to identify a gun.

21 Claims, 8 Drawing Sheets

FIG. 1

| GUN TYPE | BARREL LENGTH | CARTRIDGE | ESTIMATED BARREL DIAMETER | EFFECTIVE RANGE | RESONANT FREQUENCY ($TE_{010}$) |
|---|---|---|---|---|---|
| AK47 | 415mm (16.3 in) | 7.62x39mm | 7.62mm | 300m (330 yd) | 30.14 GHz |
| M16 | 508mm (20.0 in) | 5.56x45mm | 5.56mm | 550m (600 yd) | 41.31 GHz |
| M249 | 465mm (18.0 in) | 5.56x45mm | 5.56mm | 1000m (1094 yd) | 41.31 GHz |
| M48 MAUSER | 591mm (23.25 in) | 7.92x57mm | 7.92mm | 500m (547 yd)–800m (875 yd) | 29.00 GHz |
| M40 | 610mm (24.0 in) | 7.62x51mm | 7.62mm | 1000m (1094 yd) | 30.14 GHz |
| ALEX | 680mm (26.7 in) | 7.62x51mm | 7.62mm | 800m (875 yd) | 30.14 GHz |
| M107/M82 | 737mm (29 in) | 12.7x99mm | 12.7mm (0.5 in) | 1829m (2000 yd) | 18.08 GHz |

FIG.2

| EM MODE | M16/M249 | RESONANT FREQUENCY(GHz) | | |
|---|---|---|---|---|
| | | AK47/M40/ALEX | M48 | M107/M82 |
| TE311 | 69.06 | 50.39 | 48.48 | 30.24 |
| TE212 | 52.46 | 38.28 | 36.83 | 22.97 |
| TE211 | 52.45 | 38.28 | 36.82 | 22.97 |
| TM010 | 41.31 | 30.14 | 29 | 18.08 |
| TE111 | 31.63 | 23.08 | 22.2 | 13.85 |

FIG.3

| EM MODE | QUALITY FACTOR FOR STEEL GUN BARREL/MODEL 1, Qx10^3 | | | |
|---|---|---|---|---|
| | M16/M249 | AK47/M40/ALEX | M48 | M107/M82 |
| TE311 | 124.7 | 146 | 148.8 | 188.5 |
| TE212 | 104.8 | 122.7 | 125.1 | 158.5 |
| TE211 | 104.8 | 122.7 | 125.1 | 158.4 |
| TM010 | 92.79 | 107.8 | 110.5 | 139.4 |
| TE111 | 73.4 | 85.53 | 87.18 | 110.4 |

| GUN TYPE | RADAR CROSS SECTION (m$^2$) |
|---|---|
| M16/M249 | $5.35 \times 10^{-5}$ |
| AK47/M40/ALEX | $1.0 \times 10^{-4}$ |
| M48 | $1.8 \times 10^{-4}$ |
| M107/M82 | $3 \times 10^{-4}$ |

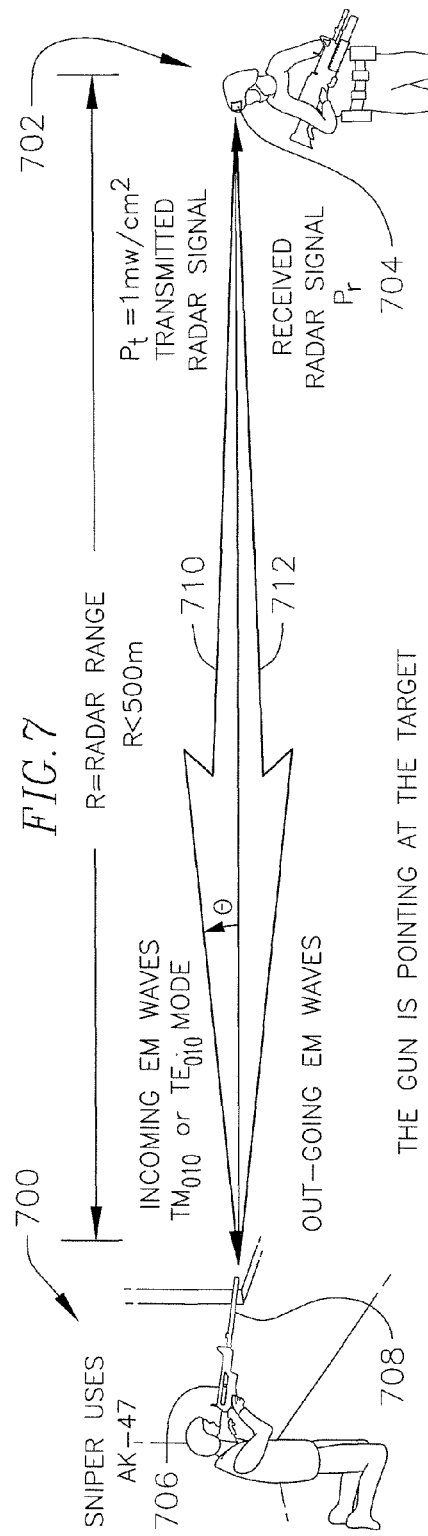
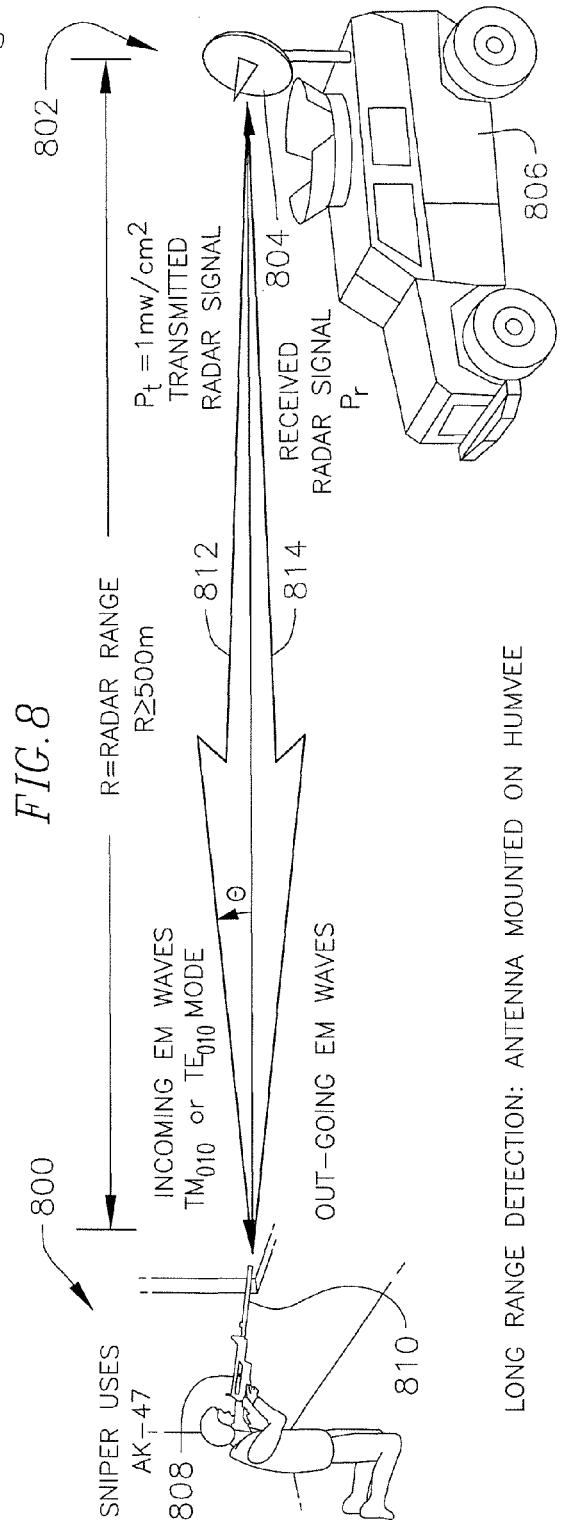
FIG. 7
FIG. 8

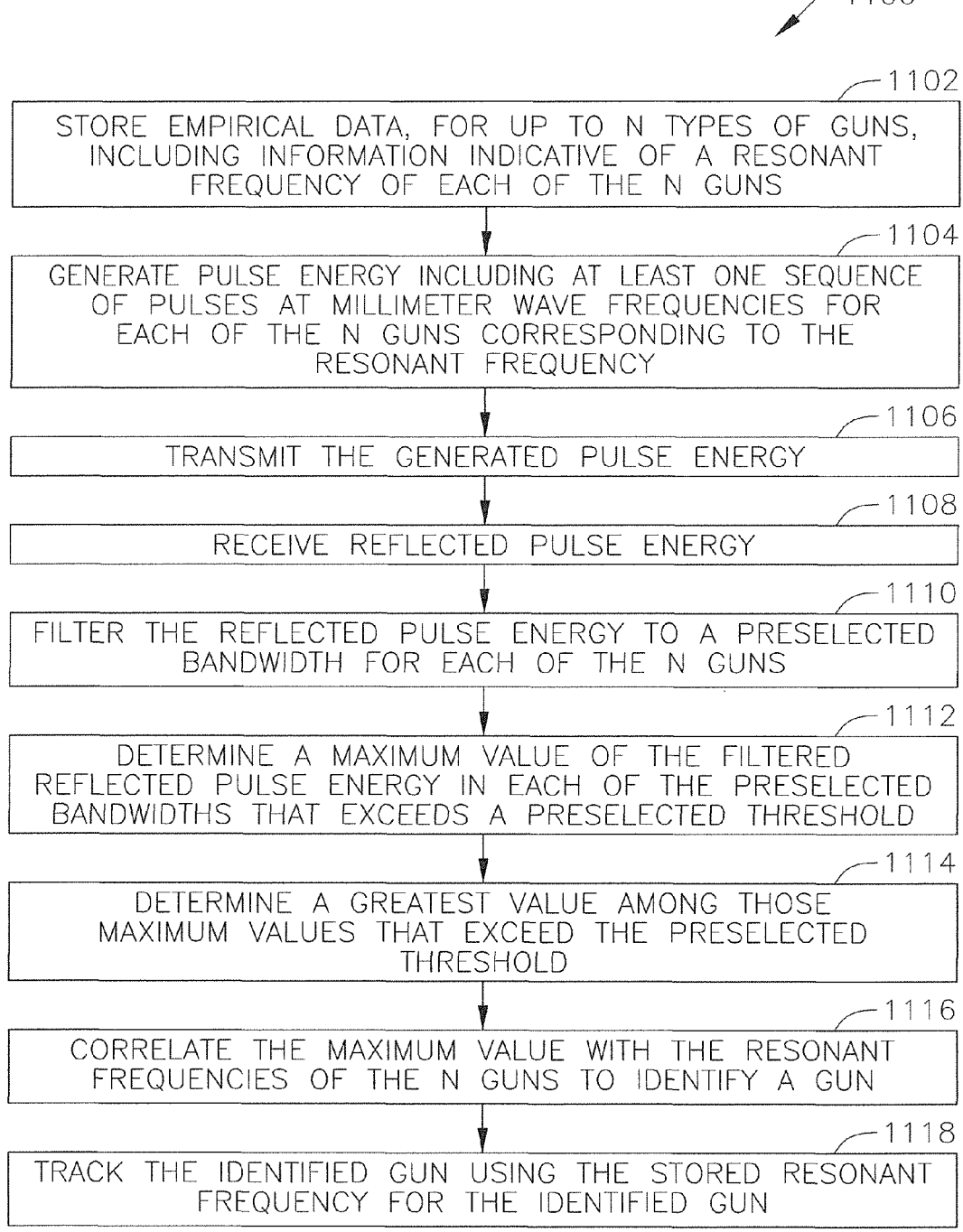

SYSTEMS AND METHODS FOR DETECTING AND TRACKING GUN BARRELS USING MILLIMETER WAVES

FIELD

The present invention relates generally to gun detection devices, and more specifically, to systems and methods for detecting and tracking gun barrels using millimeter waves.

BACKGROUND

A widely recognized shortfall in current battlefield awareness is the ability to adequately detect a sniper prior to firing a weapon or a terrorist using an automatic rifle. This shortfall is prominent for military operations in urban terrain, counter-improvised explosive device operations or for other similar operations. Conventional systems often have the ability to detect a gun after it has fired. However, unless the sniper misses, it may be too late for a soldier. Other conventional systems make use of microwave radar technology to detect guns but cannot determine the direction of the guns and require relatively large antennas for detection. As such, a system for detecting guns, such as those commonly used in armed conflicts, which can improve over these shortfalls in conventional systems is needed.

SUMMARY

Aspects of the invention relate to systems and methods for detecting and tracking a gun using millimeter waves. In one embodiment, the invention relates to a method for detecting a gun using radio frequency waves, the method including storing empirical data, for up to N types of guns, including information indicative of a resonant frequency of a barrel of each of the N guns, generating pulse energy including at least one sequence of pulses at millimeter wave frequencies for each of the N guns, transmitting the pulse energy, receiving reflected pulse energy, filtering the reflected pulse energy to a preselected bandwidth for each of the N guns, determining a first maximum value of the filtered reflected pulse energy in each of the preselected bandwidths that exceeds a preselected threshold, determining a second maximum value among the first maximum values, and correlating a frequency of the second maximum value with the stored resonant frequencies of the N guns to identify a gun.

In another embodiment, the invention relates to a system for detecting a gun using radio frequency waves, the system including a storage circuitry configured to store empirical data, for up to N types of guns, including information indicative of a resonant frequency of a barrel of each of the N guns, a generation circuitry configured to generate pulse energy including at least one sequence of pulses at millimeter wave frequencies for each of the N guns, a transceiver configured to transmit the generated pulse energy and to receive reflected pulse energy, and a processing circuitry configured to filter the reflected pulse energy to a preselected bandwidth for each of the N guns, determine a first maximum value of the filtered reflected pulse energy in each of the preselected bandwidths that exceeds a preselected threshold, determine a second maximum value among the first maximum values, correlate a frequency of the second maximum value with the stored resonant frequencies of the N guns to identify a gun.

BRIEF DESCRIPTION OF THE DRAWINGS

FIG. 1 is a table illustrating characteristics that include resonant frequencies for various gun types where the resonant frequencies have been determined by empirical testing and/or calculation using electromagnetic (EM) field theory for gun barrel models at millimeter waves in accordance with one embodiment of the invention.

FIG. 2 is a table illustrating resonant frequencies for various gun types determined by calculation and/or empirical testing using millimeter waves in various electromagnetic wave configurations in accordance with one embodiment of the invention.

FIG. 3 is a table illustrating the quality factor for various gun types determined by calculation and/or empirical testing using millimeter waves in various electromagnetic wave configurations in accordance with one embodiment of the invention.

FIG. 7 is a schematic block diagram of a battlefield environment including a sniper and a short range gun detection system having an antenna mounted on a soldier's helmet in accordance with one embodiment of the invention.

FIG. 8 is a schematic block diagram of a battlefield environment including a sniper and a long range gun detection system having an antenna mounted on a military vehicle in accordance with one embodiment of the invention.

FIG. 11 is a flow chart of a process for operating a gun detection system in accordance with one embodiment of the invention.

DETAILED DESCRIPTION

Figures 4, 5:
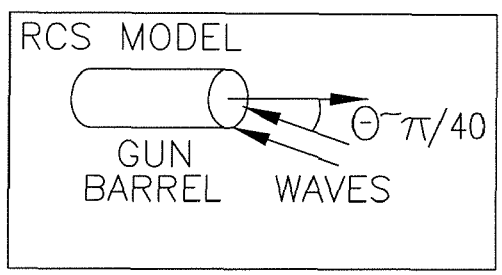
FIG. 4 is a model of a gun barrel for determining a radar cross section in accordance with one embodiment of the invention.
FIG. 5 is a table illustrating the area of radar cross sections for various gun types determined by empirical testing and/or calculations in accordance with one embodiment of the invention.

Referring now to the drawings, embodiments of gun barrel detection systems store information regarding the resonant frequencies of numerous types of guns and then generate and transmit millimeter waves based on the resonant frequencies of those gun types. Embodiments of the gun barrel detection systems then receive and analyze energy reflected from the gun barrels. For each of the types of guns, the detection systems can filter the reflected energy to a preselected bandwidth and determine a maximum received power value in the preselected bandwidth exceeding a preselected threshold. The detection systems can compare all of the maximum values for the preselected bandwidths to identify the largest maximum value or received power which corresponds to the resonant frequency of the gun reflecting the initial millimeter wave energy. Once the gun barrel type is detected, embodiments of the gun barrel detection systems can track the position of the identified gun using the stored resonant frequency information for the identified gun. In several embodiments, the detection systems use millimeter waves or other radar waves to track the identified gun.

In order to design a system for detecting the gun barrels of various guns using millimeter waves, it is helpful to conduct some study of the physical characteristics of a preselected set of guns to determine which of the gun characteristics can be used to uniquely identify a particular gun. After engaging in analysis of the characteristics and some empirical testing, it becomes apparent that the resonant frequencies of gun barrels can be used to identify particular guns using millimeter wave energy. FIGS. 1-6 illustrate the results of such analysis and empirical testing.

While not bound by any particular theory, using a couple of assumptions, a electromagnetic (EM) wave analysis can be used to estimate the resonant frequency, radar cross section and quality factor ("Q factor") of gun barrels commonly used by various militants. In a first case, it can be assumed that the gun barrel is a perfect cylindrical cavity resonator with both ends closed. In a second case, it can be assumed that the gun barrel is a perfect cylindrical cavity resonator with one end closed and the other end open. In a third case, it can be assumed that the gun barrel is a perfect cylindrical cavity resonator with a bullet at one end and the other end open. In a fourth case, it can be assumed that the gun barrel is a actual gun barrel with a bullet in the barrel. Using one or more of these assumptions, the estimated resonant frequencies, radar cross sections and Q factors of real gun barrels can be determined.

FIG. 1 is a table illustrating characteristics that include resonant frequencies for various gun types where the resonant frequencies have been determined by empirical testing and/or calculation using EM field theory for gun barrel models at millimeter waves in accordance with one embodiment of the invention. The first column 102 illustrates the type of gun used in the testing. As illustrated in FIG. 1, the tested guns include AK47, M16, M249, M48 Mauser, M40, Alex, and M107/M82 guns. These types of guns are commonly used in various military engagements. In other embodiments, other types of guns can be included. In some embodiments, less than or more than seven types of guns can be tested and thereby characterized for use in conjunction with a gun detection system.

The second column 104 illustrates the approximate length of the barrel for each respective gun type in both millimeters and inches. The third column 106 illustrates the approximate dimensions of the standard cartridge for each of the respective gun types. The fourth column 108 illustrates the estimated barrel diameter for each of the respective gun types in millimeters. The fifth column 110 illustrates the effective range for each of the respective gun types in yards. The sixth column 112 illustrates the resonant frequency in gigahertz (GHz) for one possible electromagnetic wave configuration (TE010) using millimeter waves.

FIG. 2 is a table 200 illustrating resonant frequencies for various gun types determined by calculation and/or empirical testing using millimeter waves in various electromagnetic wave configurations in accordance with one embodiment of the invention. The first column 202 illustrates the electromagnetic wave configuration or mode. For the first entry in the first column 202, the term "TE" indicates that the mode is a transverse electromagnetic wave mode, while the suffix "311" indicates the number of half-cycle variations (half-wavelength) in the angular, radial, and longitudinal directions of the resonator cavity used to generate the millimeter waves directed at the respective gun. In contrast to the transverse electromagnetic wave mode, the term "TM" indicates a transverse magnetic wave mode.

The second column 204 illustrates the resonant frequencies for an M16 gun or an M249 gun for five different electromagnetic wave modes. As the M16 and M249 guns have the same estimated barrel diameter, the resonant frequencies for these guns are also the same. The third column 206 illustrates the resonant frequencies for an AK47 gun, an M40 gun, or an Alex gun for the five electromagnetic wave modes. As these guns have the same estimated barrel diameter, the resonant frequencies for these guns are also the same. The fourth column 208 illustrates the resonant frequencies for an M48 gun for the five electromagnetic wave modes. The fifth column 210 illustrates the resonant frequencies for an M107 gun, or an M82 gun for the five electromagnetic wave modes. As these guns have the same estimated barrel diameter, the resonant frequencies for these guns are also the same.

FIG. 3 is a table 300 illustrating the quality factor for various gun types determined by calculation and/or empirical testing using millimeter waves in various electromagnetic wave configurations in accordance with one embodiment of the invention. The first column 302 illustrates the electromagnetic wave configuration or mode. For the first entry in the first column 302, the term "TE" indicates that the mode is a transverse electromagnetic wave mode, while the suffix "311" indicates the number of half-cycle variations (half-wavelength) in the angular, radial, and longitudinal directions of the resonator cavity used to generate the millimeter waves directed at the respective gun. In contrast to the transverse electromagnetic wave mode, the term "TM" indicates a transverse magnetic wave mode.

The second column 304 illustrates the quality factors for an M16 gun or an M249 gun for five different electromagnetic wave modes. As the M16 and M249 guns have the same estimated barrel diameter, the quality factors for these guns are also the same. The third column 206 illustrates the quality factors for an AK47 gun, an M40 gun, or an Alex gun for the five electromagnetic wave modes. As these guns have the same estimated barrel diameter, the quality factors for these guns are also the same. The fourth column 208 illustrates the quality factors for an M48 gun for the five electromagnetic wave modes. The fifth column 210 illustrates the quality factors for an M107 gun, or an M82 gun for the five electromagnetic wave modes. As these guns have the same estimated barrel diameter, the resonant frequencies for these guns are also the same.

FIG. 4 is a model of a gun barrel for determining a radar cross section in accordance with one embodiment of the invention. In FIG. 4, the gun barrel is modeled as a relatively perfect cylindrical cavity resonator with one end closed and the other end open. The area of the radar cross section for incident waves can be calculated based on this model.

FIG. 5 is a table illustrating the area of radar cross sections for various gun types determined by empirical testing and/or calculations in accordance with one embodiment of the invention. The first column 502 illustrates the gun type while the second column 504 illustrates the area of the radar cross sections in meters squared based on estimated or measured gun barrel diameters for each of the respective gun types.

Figure 6:
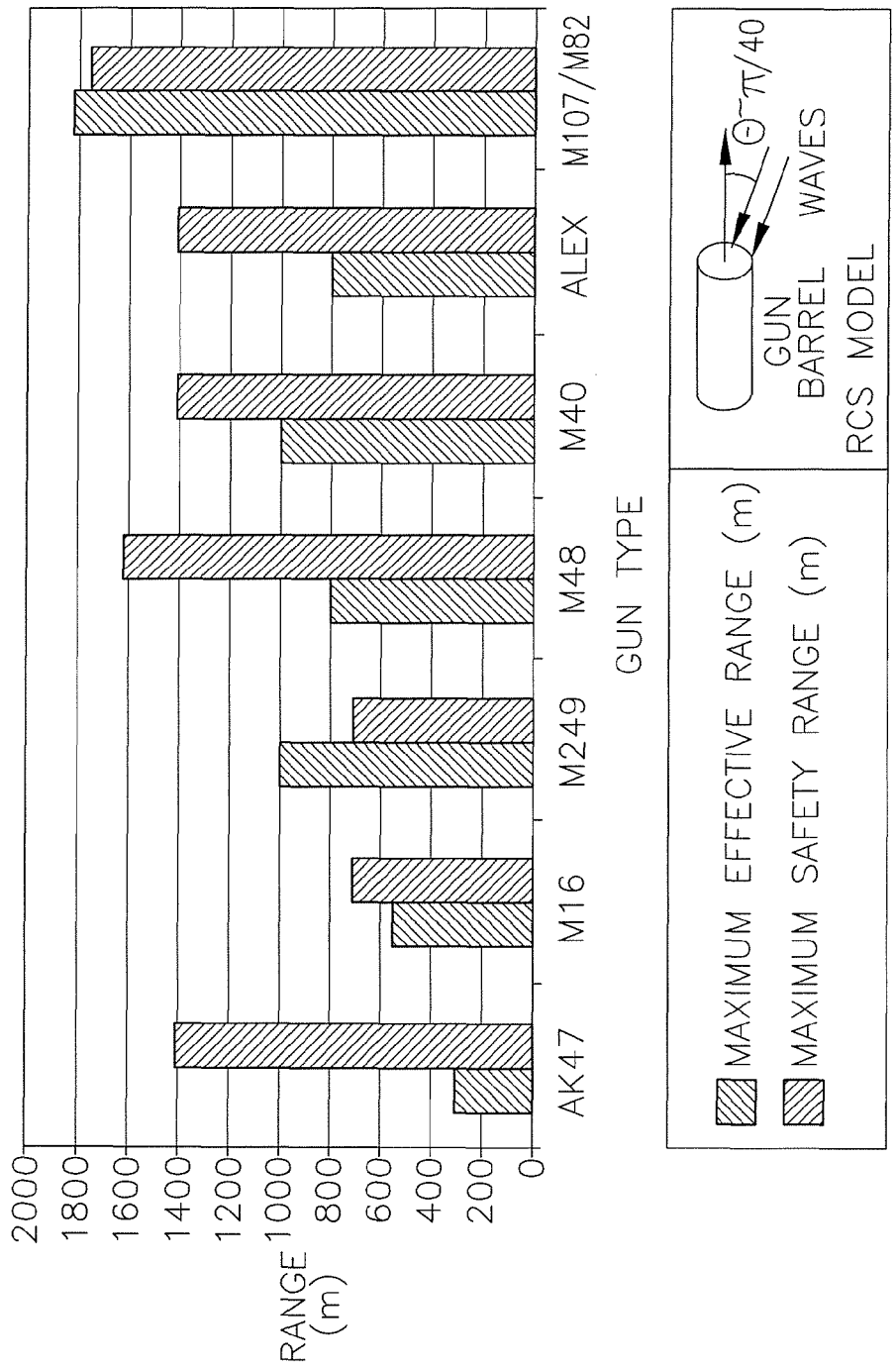
FIG. 6 is a bar graph illustrating a comparison between a maximum effective range for a millimeter wave gun detection system operating within radiation safety limits and a maximum range for each respective gun in accordance with one embodiment of the invention.

FIG. 6 is a bar graph illustrating a comparison between a maximum effective range for a millimeter wave gun detection system operating within prescribed radiation safety limits and a maximum range of each respective gun in accordance with one embodiment of the invention. The graph illustrates the range in meters on the vertical axis and gun type on the horizontal axis. Along the horizontal axis, for each gun type, a first bar indicates the maximum effective range of the gun and a maximum range of millimeter energy that can be used to detect the gun types within radiation safety limits established in the United States. The maximum range of millimeter energy that can be used to detect the gun types is a function of the radar cross section and correspondingly the estimated barrel diameter. For each gun type, the maximum range of millimeter energy within the safety limits is roughly greater than the effective range of the gun or is otherwise sufficient to allow for detection of the gun barrels. As such, the bar graph indicates that it is both possible to detect gun barrels using millimeter waves and to perform the detection process within established safety limits.

FIG. 7 is a schematic block diagram of a sniper 700 and a short range gun detection system 702 including an antenna 704 mounted on a soldier's helmet in accordance with one embodiment of the invention. The sniper 700 is directing an AK47 gun 706, having gun barrel 708, at the soldier 702. The detection system 702, worn by the soldier, generates and transmits millimeter electromagnetic waves 710 that are received by the gun barrel 708. As a result, reflected or outgoing electromagnetic waves 712 emanate from the gun barrel 708 and are received by the antenna 704 mounted on the soldier's helmet. In several embodiments, the detection system 702 provides an aural, tactile, visual, and/or other suitable warnings when the sniper points the gun at the soldier.

FIG. 8 is a schematic block diagram of a sniper 800 and a long range gun detection system 802 including an antenna 804 mounted on a military vehicle 806 in accordance with one embodiment of the invention. The sniper 800 is directing an AK47 gun 808, having gun barrel 810, at the military vehicle 806. The detection system 802, mounted on the military vehicle 806, generates and transmits millimeter electromagnetic waves 812 that are received by the gun barrel 810. As a result, reflected or outgoing electromagnetic waves 814 emanate from the gun barrel 810 and are received by the antenna 804 on the military vehicle 806. In several embodiments, the detection system 802 provides an aural, tactile, visual, and/or other suitable warnings when the sniper points the gun at the military vehicle.

Figure 9:
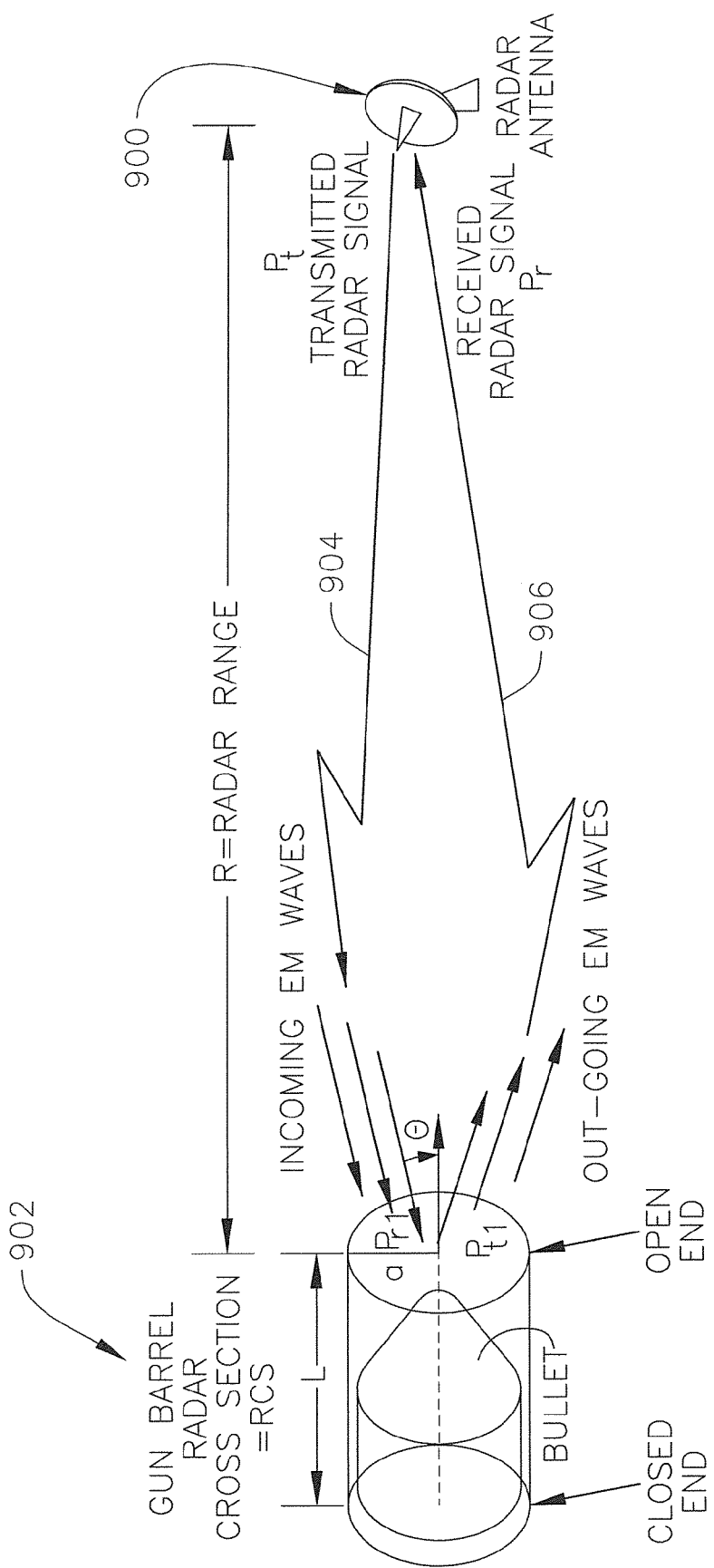
FIG. 9 is a schematic block diagram of a gun barrel detection system and a model of a gun barrel in accordance with one embodiment of the invention.

FIG. 9 is a schematic block diagram of a gun barrel detection system 900 and a model of a gun barrel 902 in accordance with one embodiment of the invention. The model of the gun barrel 902 is a relatively perfect cylindrical cavity resonator containing a bullet 903 and having one end closed and the other end open. The area of the radar cross section for incident waves to the gun barrel can be calculated based on this model. The detection system 900 generates and transmits millimeter electromagnetic waves 904 that are received by the gun barrel 902. As a result, reflected or outgoing electromagnetic waves 906 emanate from the gun barrel 902 and are received by the antenna of the detection system 900.

When the electromagnetic (EM) waves impinge on the bore of a gun barrel, the EM waves will be coupled with the bore to produce a traveling wave inside of the gun barrel. The coupling loss between the gun barrel and the incoming radar or millimeter wave signal in free space, and signal leaving the gun barrel traveling into free space, can be modeled to determine the power received at the detection system. The radar signal received at the gun barrel (Pr1) is a function of the transmitted power (Pt) times the radar antenna gain (G) times the radar cross section (RCS) divided by the product of the distance (R) squared and 4*pi. The radar signal reflected from the gun (Pt1) is a function of Pr1 multiplied the transmission loss through the gun barrel.

While not bound by any particular theory, using the analysis described above, it was determined that the radar signal received at the antenna should be approximately maximum at the gun barrel resonant frequency. Empirical testing and calculated data confirmed that the radar signal received at the antenna is approximately maximum at the gun barrel resonant frequency. In addition, the modulated radar cross section is also maximum at the gun barrel resonant frequency. As such, the gun barrel signature can be identified using its resonant frequency using millimeter waves.

Figure 10:
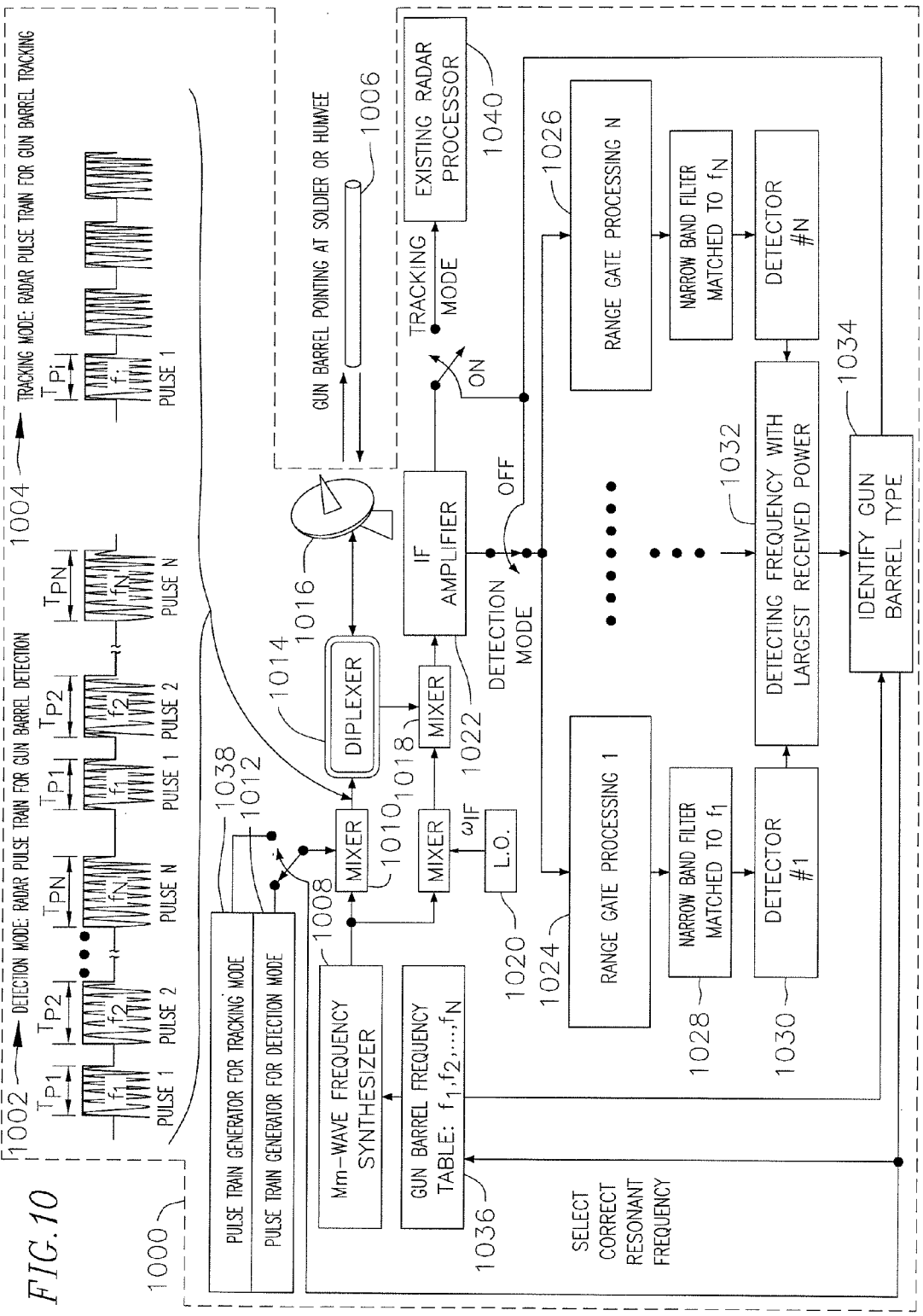
FIG. 10 is a schematic block diagram of a gun detection system, including pulsed waveforms for a detection mode and a subsequent tracking mode, and a gun barrel in accordance with one embodiment of the invention.

FIG. 10 is a schematic block diagram of a gun detection system 1000, including pulsed waveforms for a detection mode 1002 and a subsequent tracking mode 1004, and a gun barrel 1006 in accordance with one embodiment of the invention. The detection system 1000 can start in a detection mode where a radar pulse train of millimeter waves having at least N pulses 1002 is generated using electromagnetic energy provided by a millimeter wave frequency synthesizer 1008 and detection mode signals provided by a pulse train generator for detection mode 1012 which are mixed by mixer 1010. Each of the N pulses, which may actually represent a set of pulses in a preselected bandwidth, has a frequency that corresponds to the resonant frequency of one of the N types of guns. For example, pulse 1 having frequency f1 corresponds to a resonant frequency of one of the guns (e.g., an AK47 gun).

The radar pulse trains are provided to a diplexer 1014 that is configured to enable bi-directional radar signals to travel along a communication path to the antenna 1016. Outgoing radar signals are radiated from antenna 1016, while incoming radar signals that have been reflected from the gun barrel 1006 are received by antenna 1016. The incoming radar signals are provided to the diplexer 1014 and then directed to mixer 1018. The incoming radar signals are converted to an intermediate frequency (e.g., ωif) using the mixer 1018 and signals from the local oscillator 1020. The intermediate frequency incoming radar signals are amplified by an intermediate frequency amplifier 1022 and provided to a number of parallel range gate processing blocks including range gate processing block 1 (1024) to range gate processing block N (1026). The total number of range gate processing blocks, N, can correspond to the number of different types of guns being detected. In several embodiments, the detection system 1000 includes one range gate processing block for each type of gun, such that each range gate processing block is configured to analyze a portion of the reflected energy that corresponds to the frequency band of one gun type.

Each of the range gate processing blocks is configured to filter a bandwidth that is matched to a respective radar pulse. For example, range gate processing block 1 (1024) is configured to filter a bandwidth corresponding to radar pulse 1. Similarly, range gate processing block N (1026) is configured to filter a bandwidth corresponding to radar pulse N. Each of the range gate processing blocks is also configured to match the reflected energy such that the range gate is open or closed corresponding with the detection range that matched with a maximum effective range described in FIG. 6. For example, in one embodiment, say pulse 1 having frequency f1 corresponds to a resonant frequency of the AK47 gun, one of the range gate processing blocks is configured to act as a preselected filter with a bandwidth matching the resonant frequency f1, and the range gate processing will be open to process the reflected pulse with the delay that matched with the effective range of 300 meters or less as shown, for example, in FIG. 6 for the AK47.

Each of the range gate processing blocks includes a narrow band filter that is configured to filter a narrow bandwidth that is matched to the frequency of the respective radar pulse (e.g., f1). For example, narrow band filter 1028 is configured to filter a narrow bandwidth that is matched to the frequency f1 of radar pulse 1. Each of the narrow band filters provides the narrowly filtered signals to a detector which determines the largest received power signal within the filtered bandwidth that is above a preselected threshold which is selected using a maximum likelihood ratio approach based on a desired false alarm probability.

For example, narrow band filter 1028 provides the narrowly filtered signals in a band corresponding to f1 to detector 1030 which determines the largest received power signal within the filtered bandwidth that is above a preselected threshold. A multiple input comparator 1032 then receives detected maximum values from each of the range processing blocks and performs a comparison. The multiple input comparator 1032 determines the largest received power value among the received maximum values and the frequency corresponding to the determined largest value. By correlating the frequency of the largest received power signal with one of the resonant frequencies of the N gun types, the type of gun pointed at the soldier or military vehicle can be identified in block 1034. The resonant frequencies of the N gun types can be retrieved from a gun barrel frequency table 1036 including values calculated and/or measured using the empirical testing and calculation methods described above.

Once the type of gun has been detected, the detection system 1000 can switch into a tracking mode where it is operated to track the particular identified gun. In such case, the detection system 1000 operating in the tracking mode generates a radar pulse train of millimeter waves having one particular pulse type 1004 corresponding to the identified gun using electromagnetic energy provided by a millimeter wave frequency synthesizer 1008 and detection mode signals provided by a pulse train generator for tracking mode 1038, which are mixed by mixer 1010.

The tracking radar pulse train is provided to the diplexer 1014. Outgoing radar signals are radiated from antenna 1016, while incoming radar signals that have been reflected from the gun barrel 1006 are received by antenna 1016. The incoming radar signals are provided to the diplexer 1014 and then to mixer 1018. The incoming radar signals are converted to an intermediate frequency (e.g., $\omega if$) using the mixer 1018 and signals from the local oscillator 1020. The intermediate frequency incoming radar signals are amplified by an intermediate frequency amplifier 1022 and provided to a conventional radar processing system 1040 used for tracking objects such as a gun.

In some embodiments, the detection systems also include a cavity resonator and a front end filter, which can be positioned between mixer 1010 and diplexer 1014.

FIG. 11 is a flow chart of a process 1100 for operating a gun detection system in accordance with one embodiment of the invention. In particular embodiments, the process 1100 can be used in conjunction with the gun detection system of FIG. 10. The process first stores (1102) empirical data, for up to N types of guns, including information indicative of a resonant frequency of a barrel of each of the N guns at a preselected frequency. The process then generates (1104) pulse energy including at least one sequence of pulses at millimeter wave frequencies for each of the N guns corresponding to the resonant frequency. The process then transmits (1106) the generated pulse energy.

The process then receives (1108) reflected pulse energy. The process filters (1110) the reflected pulse energy to a preselected bandwidth for each of the N guns. The process determines (1112) a maximum value of the filtered reflected pulse energy in each of the preselected bandwidths that exceeds a preselected threshold. The process then determines (1114) a greatest value among those maximum bandwidth values that exceed the preselected threshold. The process correlates (1116) the greatest value with the resonant frequencies of the N guns to identify a gun type. In one such case, for example, the frequency corresponding to the greatest value is matched with a resonant frequency of one of the guns where the matching resonant frequency identifies the gun type encountered by the detection system. The process (1118) then tracks the identified gun using the stored resonant frequency for the identified gun.

In one embodiment, the process can perform the sequence of actions in any order. In another embodiment, the process can skip one or more of the actions. In other embodiments, one of more of the actions are performed simultaneously. In some embodiments, additional actions can be performed.

While the above description contains many specific embodiments of the invention, these should not be construed as limitations on the scope of the invention, but rather as examples of specific embodiments thereof. Accordingly, the scope of the invention should be determined not by the embodiments illustrated, but by the appended claims and their equivalents.

What is claimed is:

1. A method for detecting a gun using radio frequency waves, the method comprising:
   storing empirical data, for up to N types of guns, including information indicative of a resonant frequency of a barrel of each of the N guns;
   generating pulse energy comprising at least one sequence of pulses at millimeter wave frequencies for each of the N guns;
   transmitting the pulse energy;
   receiving reflected pulse energy;
   filtering the reflected pulse energy to a preselected bandwidth for each of the N guns;
   determining a first maximum value of the filtered reflected pulse energy in each of the preselected bandwidths that exceeds a preselected threshold;
   determining a second maximum value among the first maximum values; and
   correlating a frequency of the second maximum value with the stored resonant frequencies of the N guns to identify a gun.

2. The method of claim 1, further comprising tracking the identified gun using the stored resonant frequency for the identified gun.

3. The method of claim 2, wherein the tracking the identified gun using the stored resonant frequency for the identified gun comprises:
   tracking the identified gun using the stored resonant frequency for the identified gun; and
   generating pulse energy comprising a plurality of sequences of pulses at millimeter wave frequencies, wherein a period of each of the plurality of sequences of pulses corresponds to a resonant frequency of the identified gun.

4. The method of claim 1, wherein the generating pulse energy comprising the at least one sequence of pulses at millimeter wave frequencies for each of the N guns corresponding to the resonant frequency of the respective gun comprises:
   generating pulse energy comprising the at least one sequence of pulses at millimeter wave frequencies for each of the N guns, wherein a period of each of the at least one sequence of pulses corresponds to a resonant frequency of a respective one of the N guns.

5. The method of claim 1, wherein the receiving the reflected pulse energy comprises:
   receiving the reflected pulse energy; and
   transforming the reflected pulse energy to an intermediate frequency.

6. The method of claim 1, wherein:
the filtering the reflected pulse energy to the preselected bandwidth for each of the N guns is performed using at least one digital signal processor;
the determining the first maximum value of the filtered reflected pulse energy in each of the preselected bandwidths that exceeds the preselected threshold is performed using the at least one digital signal processor;
the determining the second maximum value among the first maximum values is performed using the at least one digital signal processor; and
the correlating the frequency of the second maximum value with the stored resonant frequencies of the N guns to identify the gun is performed using the at least one digital signal processor.

7. The method of claim 1, wherein the reflected pulse energy is received from a gun among the N types of guns.

8. The method of claim 7, wherein the reflected pulse energy is received from the identified gun.

9. The method of claim 1, wherein the information indicative of the resonant frequency of the barrel of each of the N guns is determined using pulse energy generated at a preselected millimeter wave frequencies.

10. The method of claim 1, further comprising generating a warning when a gun has been identified within a preselected range based on an effective range corresponding to the gun.

11. A system for detecting a gun using radio frequency waves, the system comprising:
a storage circuitry configured to store empirical data, for up to N types of guns, including information indicative of a resonant frequency of a barrel of each of the N guns;
a generation circuitry configured to generate pulse energy comprising at least one sequence of pulses at millimeter wave frequencies for each of the N guns;
a transceiver configured to transmit the generated pulse energy and to receive reflected pulse energy; and
a processing circuitry configured to:
filter the reflected pulse energy to a preselected bandwidth for each of the N guns;
determine a first maximum value of the filtered reflected pulse energy in each of the preselected bandwidths that exceeds a preselected threshold;
determine a second maximum value among the first maximum values;
correlate a frequency of the second maximum value with the stored resonant frequencies of the N guns to identify a gun.

12. The system of claim 11, wherein the processing circuitry is further configured to track the identified gun using the stored resonant frequency for the identified gun.

13. The system of claim 12, wherein the processing circuitry is configured to generate pulse energy comprising a plurality of sequences of pulses at millimeter wave frequencies, wherein a period of the plurality of sequences of pulses corresponds to a resonant frequency of the identified gun.

14. The system of claim 11, wherein a period of the at least one sequence of pulses corresponds to a resonant frequency of a respective one of the N guns.

15. The system of claim 11, wherein the reflected pulse energy is received from a gun among the N types of guns.

16. The system of claim 15, wherein the reflected pulse energy is received from the identified gun.

17. The system of claim 11, wherein the information indicative of the resonant frequency of the barrel of each of the N guns is determined using energy generated at a preselected millimeter wave frequencies.

18. The system of claim 11, wherein the processing circuitry comprises at least one digital signal processor.

19. The system of claim 11, wherein the transceiver comprises a lightweight antenna configured to be mounted to a helmet of a person.

20. The system of claim 11, wherein the transceiver comprises an antenna configured to be mounted to a vehicle.

21. The system of claim 11, wherein the processing circuitry is configured to generate a warning when a gun has been identified within a preselected range based on an effective range corresponding to the gun.

* * * * *